Patented Jan. 14, 1936

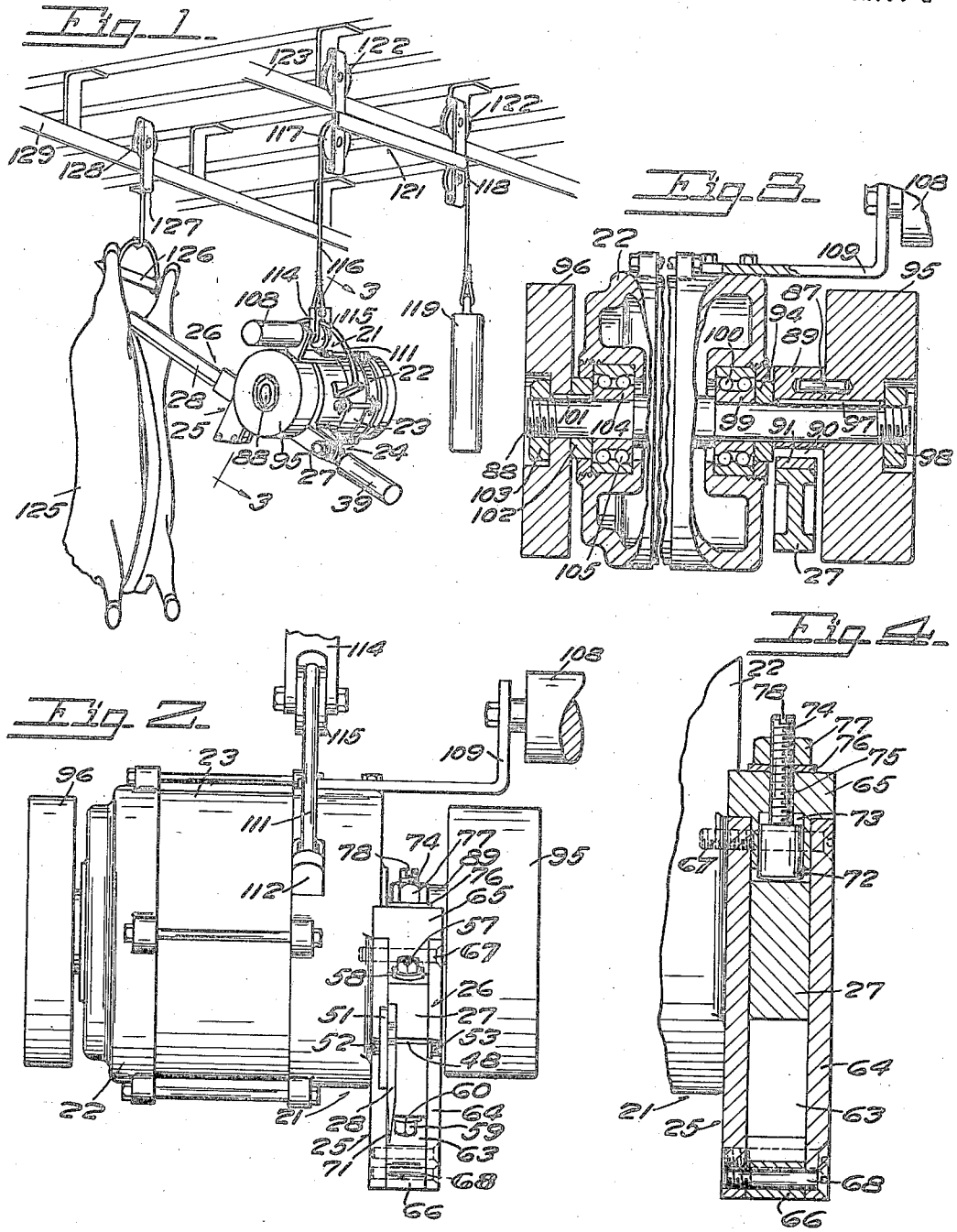

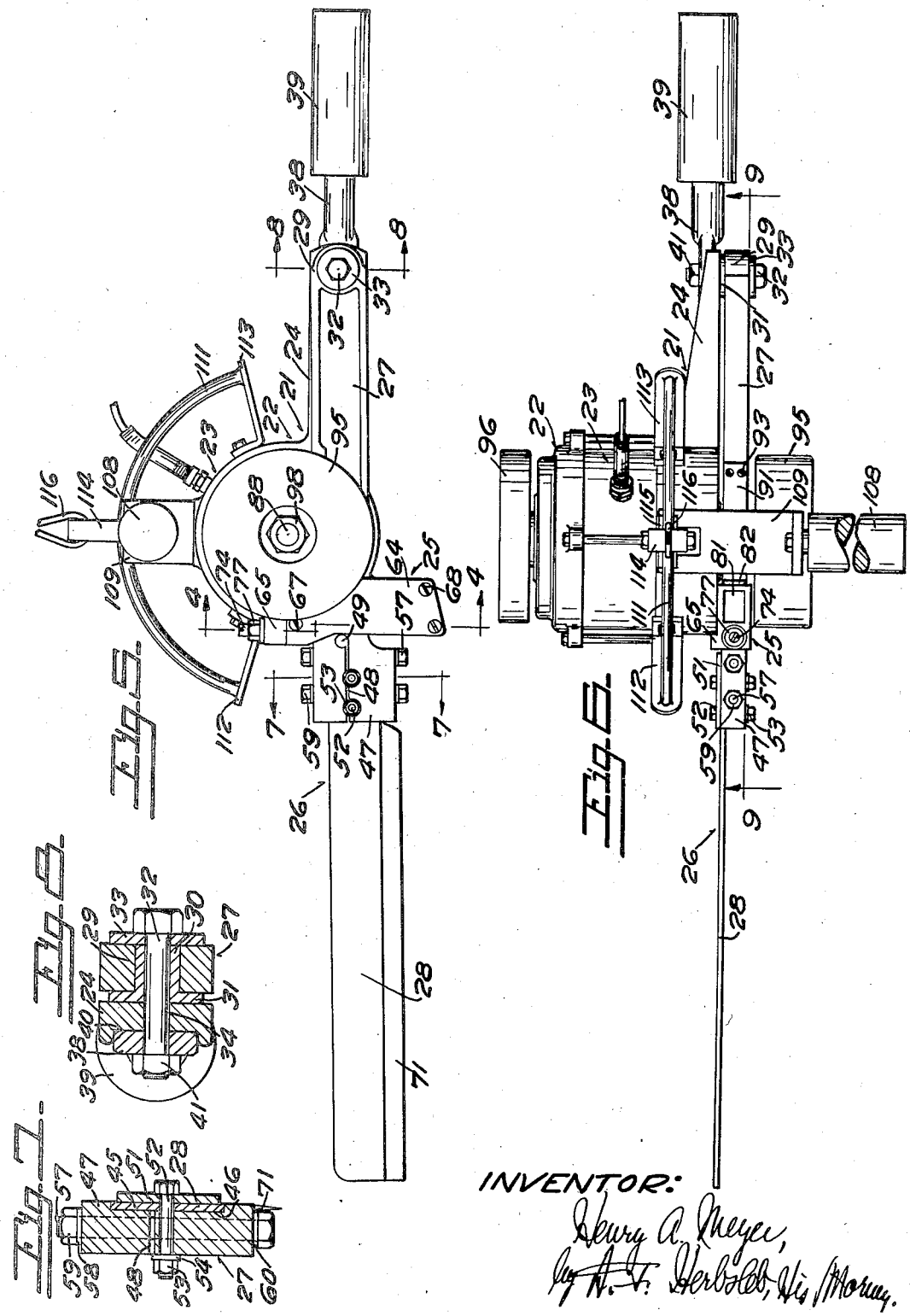

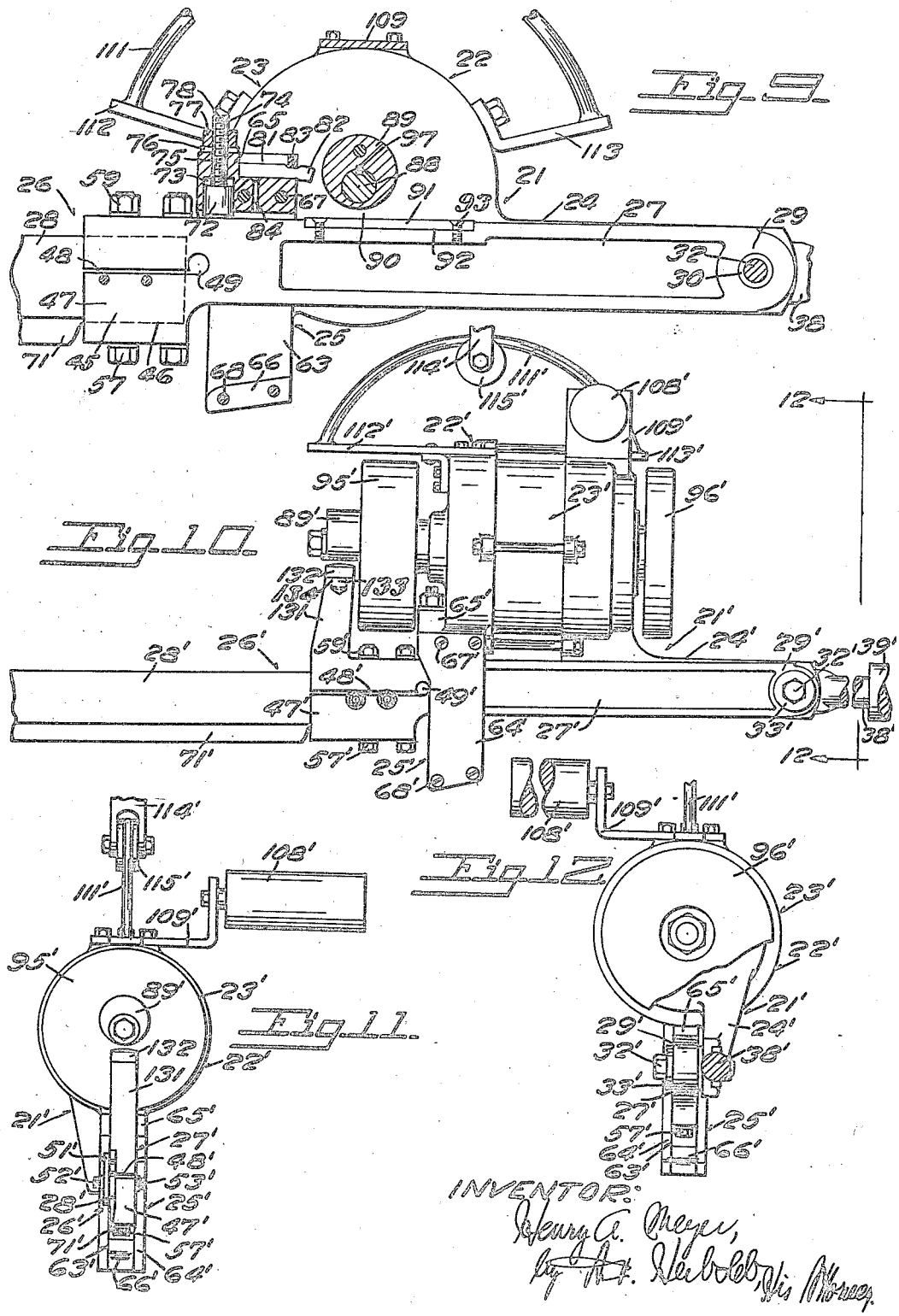

2,027,397

UNITED STATES PATENT OFFICE 2,027,397

CARCASS CLEAVING MACHINE

Henry A. Meyer, Cincinnati, Ohio, assignor of one-half to The Wolf Machine Company, Cincinnati, Ohio, a corporation of Ohio Application May 21, 1935, Serial No. 22,580

20 Claims. (Cl. 17—23)

It is the object of my invention to provide a new and improved cleaving machine for splitting carcasses, such as the carcasses of hogs, sheep, cattle and the like, such carcasses being split through the middle of the vertebræ so as to leave one-half of the bone thereof in each half of the split carcass.

In cleaving a carcass the cleaving tool penetrates and moves along the canal or central passage containing the spinal cord, marrow and fat of the spinal column, splitting the same lengthwise in the middle thereof. In carcass cleaving machines heretofore devised there has usually been a reciprocating movement of the cutting tool, with the result that the spinal cord has been spread beyond its canal and the severed bone of the vertebræ, resulting in a disfiguring of the cut faces of the severed meat, giving the meat a dull appearance and applying a coat of marrow and fat to such cut or severed surfaces, and objectionably smearing said surfaces with such marrow and fat, and thereby spoiling the appearance of the meat, rendering it less valuable and obscuring the true condition of the meat and robbing the meat of the healthy appearance it would otherwise have.

In cleaving the carcass by means of a hand cleaver, the operator swings the cleaver, splitting the back-bone in its middle if the blow is accurately placed, the cleaver being removed from the vertebræ between cutting blows. An experienced operator can cleave the carcass without substantial disfigurement of the meat by smearing, although such removal of the cleaver tends to disfigure the meat by smearing the same with the fat and marrow of the spinal column. The principal objection to such hand cleaving has been that quite large cuts are made at each cutting blow of the cleaver, the blows being further offset with relation to each other, resulting in large chips being cut from the bone, which remain on the bone in the severed halves of the carcass or on the severed meat portions thereof, and are objectionable because of their appearance and because the same usually have sharp edges which are likely to injure the person handling the halves of the carcass or the meat therefrom.

A cut surface of the meat adjacent to the vertebræ is desired which is not coated or covered or provided with foreign substances and which exposes the true condition of the meat, which meat, in the carcass of a healthy animal, has a bright appearance, and is of a color dependent on the kind of animal and the condition of the animal immediately before being slaughtered. It is desirable that the natural appearance of the meat adjacent the backbone be retained, so that the true, healthy condition of the slaughtered animal may be shown, thus increasing the value of the meat of healthy slaughtered animals.

It is the object of my invention, further, to provide a carcass cleaving machine of simple construction and economical operation.

My invention consists in providing novel means for accomplishing these objects, and in providing novel means whereby the carcass may be split without disfiguring the meat adjacent to the vertebræ, and without detrimentally chipping the bones.

My invention consists, further, in providing a novel cleaving machine in which the cleaving cutter extends endwise beyond the operating means for the same; further, in providing novel means for actuating said cleaving cutter solely in cleaving direction so as to avoid smearing or defacing the cut meat adjacent to the vertebræ; further, in providing novel means for imparting short and rapid actuations in cutting direction to the cleaving cutter; further, in providing novel means whereby the cleaving cutter is normally spaced from the impacting element so as to cause sharp and forceful impacts upon the cleaving cutter; and, further, in providing novel means for exerting forceful blows upon the cleaving cutter for severing the bones of the vertebræ.

My invention consists, further, in providing novel means for high frequency actuation of the cleaving cutter in actuating direction outside the cutting path of the cleaving cutter, and for causing actuation of the cleaving cutter solely in such cutting direction.

The invention will be further readily understood from the following description and claims, and from the drawings, in which latter:

Fig. 1 is a perspective view of my improved device shown in suspended position and in position of use in connection with a carcass, partly broken away.

Fig. 2 is an end view of my improved device, viewed from the cutter end thereof, partly broken away.

Fig. 3 is an axial section of my improved device, taken on the line 3—3 of Fig. 1, shown partly in side elevation, and partly broken away.

Fig. 4 is a cross-sectional detail view of my improved device, taken on the irregular line 4—4 of Fig. 5.

Fig. 5 is a side elevation of my improved device.

Fig. 6 is a plan view of the same.

Fig. 7 is a cross-sectional detail view showing clamping means for the knife blade, taken on the line 7—7 of Fig. 5.

Fig. 8 is a cross-sectional detail view, showing the pivoting means for the knife arm, taken on the line 8—8 of Fig. 5.

Fig. 9 is a section of my improved device, taken on the line 9—9 of Fig. 6, and partly broken away.

Fig. 10 is a side elevation showing a modification of my improved device, partly broken away.

Fig. 11 is an end view of the same, viewed from the knife end of the machine, partly broken away; and, Fig. 12 is a cross-section of the same, taken on the line 12—12 of Fig. 10, and partly broken away.

My present invention is an improvement and elaboration upon the form of the invention shown, described and claimed in my co-pending application for United States patent on Improvement in carcass cleaving machine, Serial No. 504,003, filed December 22, 1930.

A frame 21 is shown as part of a motor casing 22 of an electric motor 23. (Figs. 2, 5, 6 and 9). The frame comprises a bracket 24 extending rearwardly and a bracket 25 at the forward portion of the frame.

A cleaving blade 26 comprises an arm 27 and a cutter blade 28 extending endwise therefrom. (Figs. 2, 5, 6 and 8). The arm has a bearing 29 about a journal sleeve 30 having an annular flange 31, and located about a bolt 32. There is a washer 33 about the bolt, the bearing 29 being located on the sleeve between said washer and the annular flange 31, the sleeve being of such length in the bearing that the bearing is permitted to oscillate upon the sleeve between the flange and the washer without lost motion when the bolt is clamped, so that the arm oscillates in a definite path. The bolt is located in a hole 34 in the bracket 24.

The shank 38 of a handle 39 is located in a recess 40 in the side of the bracket, (Figs. 5, 6 and 8), the bolt passing through a hole in said shank and the shank being positioned by the bolt and between the side walls of the recess 40 when the bolt is clamped for rigidly positioning the handle with relation to the frame. A nut 41 is threaded over the threaded end of the bolt for clamping the washer, the sleeve, the bracket and the shank of the handle rigidly together while permitting oscillation of the arm or cleaving cutter 26.

The cutter blade 28 is rigidly secured to the arm 27 for movement with the arm. It extends endwise from the arm. (Figs. 5, 6 and 7). The shank 45 of the blade is preferably rectangular, and is received in a recess 46 in the side of a clamp 47 formed in the end of the arm, the end of the arm being provided with a slot 48 terminating at its inner end in a hole 49 in said arm for forming clamping jaws for the knife in the swinging end of said arm.

A plate 51 is at the outer face of the shank of the cutter blade. Bolts 52 pass through holes in said plate, in the shank of the cutter blade and in one of the jaws of the clamp 47, a nut 53 being threaded over the threaded end of each of said bolts for clamping the plate, the shank of the cutter blade, the jaw and a washer 54 between the head of the bolt and said nut.

The jaws are drawn together upon the edges of the shank of the cutter blade by bolts 57 passing through holes in said jaws, washers 58 and nuts 59 being received over the threaded ends of said bolts and washers 60 being located between the heads of said bolts and said jaws; relative rotation between the bolts and the nuts clamping the jaws upon the shank of the cutter blade. The arm 27 forms an actuating part for the cutter blade 28.

The swinging end of the cutter arm is guided in its path by the opposite walls of a guideway 63. (Figs. 2, 4, 5, 6 and 9). One of the walls of this guideway is formed by the bracket 25 and the other wall thereof is formed by a plate 64. A spacer block 65 is located between the upper ends of said bracket and said plate, and a spacer block 66 is located between the lower ends of said bracket and said plate, these spacer blocks being of a thickness just sufficiently greater than the thickness of the forward end of the cutter arm between said bracket and said plate to form a guideway for said cutter arm between said bracket and said plate, to guide the cutter in its cutting path. Screws 67, 68 passing through said plate and said respective blocks and threaded into the frame and its bracket, clamp the side walls of the guideway and the separating blocks rigidly together.

The cutter blade is provided with a cutting edge 71 which preferably extends throughout the length of the cutter blade beyond its attachment to the cutter arm.

A stop 72 is provided to limit retraction of the cleaving cutter. (Figs. 4 and 9). It is shown as a plunger in a recess 73 in the block 65, the plunger having a threaded shank 74 extending therefrom in a threaded bearing 75 in the upper wall of the recess, a washer 76 and a nut 77 being received over the threaded shank.

The plunger and its recess are round in cross section and the outer end of the shank of the plunger is provided with a slot 78 for the reception of a screw driver for rotating the shank for adjustment of the plunger toward and from the cleaving cutter, the nut serving as a jam nut for locking the plunger in adjusted position.

The spacer block 65 is also provided with a lubricant cavity 81 in which there is a wiper 82, for instance, of felt, which extends through a slot 83 in the inner wall of the cavity (Figs. 6 and 9). A feeding hole 84 extends through the bottom of the cavity so as to drip oil upon the cleaving cutter for lubricating the contact faces between it and the walls of its guideway 63, as well as the contact faces between the upper face of the cleaving cutter and the plunger.

The rotor of the electric motor is provided with a shaft 88 which has on it an actuating member 89 for actuating the cleaving cutter. (Figs. 3, 5 and 9.) This actuator is exemplified as a cam in the form of an eccentric. It rotates with its shaft and is preferably throughout a portion thereof normally out of contact with the cleaving cutter, as note the space 90 between the low point of the eccentric and the cleaving cutter. The eccentric or cam is arranged to make contact with the cleaving cutter during its revolution to actuate the cleaving cutter in cleaving direction.

While the cam is shown as an eccentric, it may be of other form for accomplishing the results, the idea being to impart quickly actuating forceful and frequent impulses to the cleaving cutter solely in cutting direction lengthwise of the vertebræ of the carcass being severed, for cleaving the carcass by successive actuations of the cleaving cutter in cleaving direction, without retraction of the same, so as to cause a clean cut to be made through the middle of the vertebræ lengthwise thereof without reverse or lateral rubbing of the cleaving cutter upon the bone of the vertebræ or the neighboring flesh in order to avoid spreading of the spinal cord and the fat and marrow adjacent to the spinal column upon the bone of the vertebræ and especially upon the meat adjacent thereto, whereby the meat is left clean and healthy looking; the meat retaining a clean surface like the surface of a cut of meat in which the knife contacts the meat only.

The cutter arm is provided with a hardened striker plate 91 in a recess 92 in the cutter arm and fixed to the cutter arm by screws 93. (Figs. 3 and 9.) The wiper 82 is contacted by the cam so as to lubricate the cam and its contact area with the striker plate.

The motor shaft is provided with fly wheels 95, 96 rotating therewith. (Figs. 1, 2 and 3.) A key 97 located respectively in slots in said shaft and in the cam 89 and the fly wheel 95 rotatively connect said shaft, cam and fly wheel, a nut 98 threaded over the threaded end of the shaft clamping the fly wheel 95 and the cam 89 against the inner raceway 99 of a ball bearing 100 between said shaft and the frame.

A key 101 is located in slots in said shaft and in the fly wheel 96 and a collar 102 about said shaft, a nut 103 over the other threaded end of the shaft clamping the fly wheel 96 and collar 102 upon the inner raceway 104 of another ball bearing 105 between said shaft and the casing.

The frame is provided with handles 39, 108 for guiding the device and the path of the cleaving cutter. (Figs. 1, 2, 5 and 6.) The handle 108 is shown on a bracket 109 fixed to the motor frame and extending laterally therefrom. The handle 39 is shown extending from the shank 38 rearwardly from the frame. These handles may be grasped by the two hands of the operator for definitely guiding the frame and the cleaving cutter and for aiding in elevating and lowering the device.

The mounting for the cleaving cutter is preferably suspended so that the same may be raised and lowered, and it is pivotally mounted so as to swing the cutter blade laterally into desired position, and is also pivotally mounted and rotatively mounted so as to tilt the cleaving cutter in desired upward or downward angles.

For accomplishing this an arcuate strap 111 is rigidly secured to brackets 112, 113, fixed to the frame. (Figs. 1, 2, 5 and 6.) A fork 114 has a grooved roller 115 journaled therein, the roller being received under the strap so that the strap is supported by the roller. A cable 116 extends upwardly from the fork and passes over pulleys 117, 118, and thence downwardly, having a counterweight 119 thereon for counterbalancing the cleaving device.

The pulleys 117, 118 are journaled in a hanger 121, which also has grooved rollers 122 journaled therein, these latter rollers being supported by a track 123 suitably rigidly supported.

A carcass is represented at 125 on a gambrel bar 126, from the ends of which the legs of the carcass are suspended, the gambrel bar acting to urge separation of the legs and of the halves of the cut portion of the carcass as the cleaving of the vertebræ thereof proceeds. (Fig. 1.) The gambrel bar is supported from a hanger 127 provided with a grooved roller 128 journaled therein, the roller riding on a usual track 129 suitably supported, along which the carcass is moved to various stations for various operations thereon.

In practice the carcass is moved along the track 129 to the station at which the cleaving is being performed. The cleaving device is movable along its track 123 throughout the cleaving station and the device may be raised and lowered, aided by the counterweighting arrangement, and it may be pivotally swung in a horizontal plane and in a vertical plane so as to place the cleaving blade against the end of the vertebræ by manipulation thereof through the medium of its handles 39, 108, it being understood that the cleaving cutter normally drops by gravity on its pivot so as to rest on the lower block 86 of its guide, and out of contact with the cam 89 and the stop 72. This leaves the blade quiet so that the operator can definitely position the cutting edge thereof in the middle of the vertebræ, the cleaving cutter at the beginning of the operation being swung upwardly, as indicated in Fig. 1.

When the operator has determined the position of the cleaving blade upon the vertebræ, he urges the supporting part of the device downwardly, thereby causing approach between the cleaving cutter and its operating cam, which latter is in the meantime being rotated by the electric motor at a rapid speed, for example, at 1725 to 3450 R. P. M. As soon as the cleaving cutter has been brought into the range of movement of the high point of the cam, the latter exerts cutting actuations upon the cleaving cutter to cause the latter to enter the carcass at the point selected by the operator by contact of the cleaving cutter with the carcass.

It will therefore be appreciated that the cleaving cutter is in quiet position or unactuated during the time that the operator locates its point of contact with the carcass, enabling such point of contact to be seleced with exactitude, and avoiding vibration or dancing of the cleaving cutter on the carcass during such selection. When the operative part of the device has been lowered sufficiently for contact between the cam and the cleaving cutter, the splitting of the carcass begins. Pressure will also be exerted by the operator by bearing down on the handles, between the cleaving cutter and the carcass so as to maintain the selected positions between the two.

Approach between the cleaving cutter and the cam is limited by the stop 72 for creating the normal space 90 between the cleaving cutter and the cam. The force and duration of contact between the cam and the cleaving cutter may be regulated by adjustment of the stop 72.

As the cutting proceeds lengthwise of the vertebræ the operator swings the cutting end of the cleaving cutter downwardly by causing travel between the arcuate strap 111 and the roller 115, and the operator also causes descent of the device by bearing upon the handles and thereby elevating the counterweight 119 and, during descent of the device in the progress of the cutting of the vertebræ, the cleaving cutter is brought into more nearly horizontal position, and toward the end of the operation the cleaving cutter is swung in the opposite direction with its cutter blade projected at an angle downwardly.

The cleaving of the vertebræ takes place by the cleaving cutter acting solely in cutting direction, so that the successive actuating impulses upon the cleaving cutter cause progressive cutting of the same along the vertebræ in such manner that each cutting movement is a continuation of its preceding cutting movement in order that the cutting may take place in a single direction with intermittent steps and in such manner that other than progressive cutting movements between the cutter blade and the carcass are avoided. As the cutting proceeds downwardly along the carcass, the two halves of the carcass spread so as to free contact between the upper portions of the cutter blade and the adjacent portions of the carcass.

The strap 111 is at the middle portion of the length of the suspended device, the points of attachment of the strap to the casing and the weights of the balance wheels 95, 96, being such that the device is balanced when suspended by the roller 115.

In the preferred embodiment in my invention disclosed in Figs. 1 to 9 inclusive, the axis of the operating cam 89 is at right angles to the plane of the cutting path of the cleaving cutter. In the modification shown in Figs. 10, 11 and 12, the cam and its motor shaft are parallel with the plane of the path of the cleaving cutter, similar parts being designated by similar but primed reference numerals. In this modification the cutter arm 27' is provided with an upward extension 131, at the upper end of which there is an anvil 132 for receiving the blows of the cam 89'. This anvil may be a hardened block provided with a stem 133, which is threaded into a threaded hole 134 at the upper end of the upward extension 131.

The cutting portion of the cleaving cutter extends endwise in the direction of the cutting edge thereof outwardly and beyond the frame and the actuating parts therefor, and this cutting portion has a different path when being fed lengthwise of the carcass than the path of the operating parts therefor. Only a comparatively thin cutter blade need therefore extend into the carcass, so that separation between the severed faces of the carcass while being cut is reduced to the minimum. Furthermore, the cutter blade has impulses applied thereto so that it moves only in one direction, namely, the cutting direction while in the carcass, so that smearing or defacing of all portions of the meat of the carcass is avoided.

The impacts upon the cleaving cutter are very forceful and very frequent, being operated, for example, by a motor in a range of three-quarters to two horse power whose rotor rotates in a range of 1725 to 3450 R. P. M., depending on the duty required and the kind of carcass being cleaved, the vertebræ of some animals being harder than others. Short, sharp, forceful actuations at very frequent intervals are applied to the cleaving cutter, whereby smooth cutting of the vertebræ is accomplished without objectionable chipping thereof, and the cutting is accomplished rapidly and economically.

I claim:

1. In a carcass cleaving machine, the combination of a portable frame, a cleaving cutter having a cleaving knife portion, said cleaving knife portion extending beyond said frame in the direction of length of said cleaving cutter, so as to dispose said cleaving knife portion and said frame in end to end relation, pivot mounting means on said portable frame for said cleaving cutter for pivotal cleaving movements of said cleaving knife portion in the plane of said cleaving knife portion, an actuating part for said cleaving cutter and operating means for said actuating part for imparting said pivotal movements, said pivot mounting means, said actuating part and said operating means being located solely at the frame end of said cleaving cutter.

2. In a carcass cleaving machine arranged for descent lengthwise of a suspended carcass during the cleaving operation, the combination of a portable frame, a cleaving cutter having a cleaving knife portion which extends beyond said frame in the direction of length of said cleaving cutter so as to dispose said cleaving knife portion and said portable frame in different paths during said descent, pivot mounting means on said portable frame for said cleaving cutter for pivotal cleaving movements of said cleaving knife portion in the plane of said cleaving knife portion, an actuating part for said cleaving cutter and operating means on said portable frame for said actuating part for imparting said pivotal cleaving movements, said pivot mounting means, said actuating part and said operating means being located solely at the frame end of said cleaving cutter.

3. In a carcass cleaving machine arranged for descent lengthwise of a suspended carcass during the cleaving operation, the combination of a portable frame including a driving motor, a cleaving cutter having a cleaving knife portion, said cleaving knife portion extending beyond said frame in the direction of length of said cleaving cutter so as to dispose said cleaving knife portion and said portable frame in different paths during said descent, pivot mounting means on said portable frame for said cleaving cutter for pivotal cleaving movements of said cleaving knife portion in the plane of said cleaving knife portion, and an actuating part for said cleaving cutter operated by said motor and normally operatively spaced from said cleaving cutter and arranged for momentary intermittent actuations of said cleaving cutter, said cleaving knife portion solely extending into said suspended carcass and the remainder of said mechanism being outside said suspended carcass during said descent.

4. In a carcass cleaving machine arranged for descent lengthwise of a suspended carcass during the cleaving operation, the combination of a cleaving blade in the carcass position, means for pivoting said cleaving blade and means for operating said pivoted cleaving blade outside the carcass position, said cleaving blade being the sole part of said carcass cleaving machine located within the carcass during the cleaving operation.

5. In a carcass cleaving machine arranged for descent lengthwise of a suspended carcass during the cleaving operation, the combination of a cleaving blade in the carcass position, means for pivoting said cleaving blade and means for operating said pivoted cleaving blade outside the carcass position, said cleaving blade being the sole part of said carcass cleaving machine located within the carcass during the cleaving operation, said means for operating said blade including an arm with which said cleaving blade has operative connection and an actuating part normally spaced from said arm and intermittently engaging said arm for actuations of said arm.

6. In a carcass cleaving machine arranged for descent lengthwise of a suspended carcass during the cleaving operation, the combination of a cleaving blade in the carcass position, means for pivoting said cleaving blade and means for operating said pivoted cleaving blade outside the carcass position, said cleaving blade being the sole part of said carcass cleaving machine located within the carcass during the cleaving operation, said means for operating said blade including an arm with which said cleaving blade has operative connection, an actuating part normally spaced from said arm and intermittently engaging said arm for actuations of said arm, and adjusting means for limiting the approach of the arm relative to said actuating part.

7. In a carcass cleaving machine, the combination of a portable frame, a cleaving cutter pivoted thereon and having an endwise extended cutting portion, said cutting portion located endwise beyond said frame, a motor on said frame, and an actuating part outside the cutting path of said cutting portion operated by said motor and normally operatively spaced from said cleaving cutter and acting on said cleaving cutter so as to impart actuating movements thereto.

8. In a carcass cleaving machine, the combination of a portable frame, a cleaving cutter pivoted thereon and having an endwise extended cutting portion, said cutting portion located endwise beyond said frame, a motor on said frame, an actuating part operated thereby and normally operatively spaced from said cleaving cutter and acting on said cleaving cutter so as to impart actuating movements thereto; and separating means limiting approach of said cleaving cutter to said actuating part.

9. In a carcass cleaving machine, the combination of a portable frame, a cleaving cutter pivoted thereon and comprising an endwise extending knife provided with an elongated cutting portion, a motor on said frame, an actuating part operated thereby acting on said cleaving cutter so as to impart pivotal cutting movements thereto, separating means limiting approach of said cleaving cutter to said actuating part, and adjusting means adjusting said separating means.

10. In a carcass cleaving machine, the combination of a portable frame, a knife arm pivoted thereto, said knife arm comprising a knife extending endwise from said frame, a motor on said frame, an actuating member operated thereby, said actuating member comprising an actuating part moving in a path passing through said knife arm and acting intermittently on said knife arm for actuating said knife solely in cutting direction, said part at one stage of its movement being spaced from said knife arm, and means limiting approach of said knife arm to said last-named part.

11. In a carcass cleaving machine, the combination of a portable frame, a knife arm pivoted thereto, said knife arm comprising a knife extending endwise from said frame, a motor on said frame, an actuating member operated thereby, said actuating member comprising an actuating part moving in a path passing through said knife arm and acting intermittently on said knife arm for actuating said knife, said part at one stage of its movement being spaced from said knife arm, means limiting approach of said knife arm to said last-named part, and adjusting means adjusting said limiting means.

12. In a carcass cleaving machine, the combination of a portable frame, a motor thereon, a knife arm pivoted to said frame, said knife arm comprising a cleaving knife extending endwise therefrom beyond said frame and said motor and moving in a cutting path which is endwise removed from the location of said frame and said motor, and an actuating part at said frame outside the cutting path of said cleaving knife for said knife arm operated by said motor.

13. In a carcass cleaving machine, the combination of a portable frame, a motor thereon, a knife arm pivoted to said frame, said knife arm comprising a cleaving knife extending endwise therefrom beyond said frame and said motor and moving in a cutting path which is endwise removed from the location of said frame and said motor, an actuating part at said frame for said knife arm operated by said motor, said actuating part being normally spaced from said knife arm, and means limiting normal approach of said knife arm to said actuating part.

14. In a carcass cleaving machine, the combination of a portable frame, a motor thereon, a knife arm pivoted to said frame, said knife arm comprising a cleaving knife extending endwise therefrom beyond said frame and said motor and moving in a cutting path which is endwise removed from the location of said frame and said motor, an actuating part at said frame for said knife arm operated by said motor, said actuating part being normally spaced from said knife arm, means limiting normal approach of said knife arm to said actuating part, and means adjusting said limiting means.

15. In a carcass cleaving machine, the combination of a portable frame, a cleaving cutter pivoted thereon and including a cleaving knife, a motor on said frame, and a cam rotated thereby, said cleaving cutter being normally spaced from said cam and arranged for operative connection with said cam by contact of said cleaving knife with the carcass and by cleaving pressure exerted upon said cleaving knife.

16. In a carcass cleaving machine, the combination of a portable frame, a cleaving cutter pivoted thereon and including a cleaving knife, a motor on said frame, a cam rotated thereby, said cleaving cutter being normally spaced from said cam and arranged for operative connection with said cam by contact of said cleaving knife with the carcass and by cleaving pressure exerted upon said cleaving knife, and means limiting approach of said cleaving cutter to said cam so that a portion of the low portion of said cam is removed from operative connection with said cleaving cutter.

17. In a carcass cleaving machine, the combination of a portable frame, a cleaving cutter pivoted thereon and including a cleaving knife, a motor on said frame, a cam rotated thereby, said cleaving cutter being normally spaced from said cam and arranged for operative connection with said cam by contact of said cleaving knife with the carcass and by cleaving pressure exerted upon said cleaving knife, means limiting approach of said cleaving cutter to said cam so that a portion of the low portion of said cam is removed from operative connection with said cleaving cutter, and means for adjusting said last-named means.

18. In a carcass cleaving machine, the combination of a portable electric motor, a bracket extending rearwardly therefrom, a cleaving cutter pivoted to said bracket, a guide for said cleaving cutter at the forward portion of said motor, and a cam operated by said motor, said cam acting intermittently on said cleaving cutter for pivotally moving the same.

19. In a carcass cleaving machine, the combination of a portable electric motor, a bracket extending rearwardly therefrom, a cleaving cutter pivoted to said bracket, a guide for said cleaving cutter at the forward portion of said motor, a cam operated by said motor, said cam acting intermittently on said cleaving cutter for pivotally moving the same, and a stop for said cleaving cutter limiting its approach toward said cam.

20. In a carcass cleaving machine, the combination of a portable electric motor, a bracket extending rearwardly therefrom, a cleaving cutter pivoted to said bracket, a guide for said cleaving cutter at the forward portion of said motor, a cam operated by said motor, said cam acting intermittently on said cleaving cutter for pivotally moving the same, a stop for said cleaving cutter limiting its approach toward said cam, and adjusting means for said stop for regulating said approach.

HENRY A. MEYER.